United States Patent [19]

Woodman

[11] 4,332,485

[45] Jun. 1, 1982

[54] PORTABLE FREEZER HAVING MECHANICAL MEANS PROVIDING VISUAL INDICATION OF FIRMNESS OF CONTENTS

[75] Inventor: Robert C. Woodman, Hattiesburg, Miss.

[73] Assignee: Sunbeam Corporation, Chicago, Ill.

[21] Appl. No.: 258,865

[22] Filed: Apr. 30, 1981

Related U.S. Application Data

[63] Continuation of Ser. No. 69,016, Aug. 22, 1979, abandoned.

[51] Int. Cl.³ .............................................. A23G 9/10
[52] U.S. Cl. ..................................... 366/142; 62/136; 366/231
[58] Field of Search ............... 366/142, 221, 224, 226, 366/230, 231; 62/127, 136; 73/59

[56] References Cited

U.S. PATENT DOCUMENTS

| | | | |
|---|---|---|---|
| Re. 27,019 | 1/1971 | Harker | 62/136 |
| D. 251,432 | 3/1979 | Sawada et al. | D15/82 |
| 1,106,865 | 8/1914 | Dorr | 73/59 |
| 1,449,458 | 3/1923 | Sutermeister . | |
| 1,763,567 | 6/1930 | Simmons et al. . | |
| 1,880,021 | 9/1932 | McCauley et al. . | |
| 2,079,247 | 5/1937 | Eckstein | 73/59 |
| 2,096,222 | 10/1937 | Bock | 73/59 |
| 2,122,470 | 7/1938 | Hoffmann | 73/59 |
| 2,239,726 | 4/1941 | Martin | 73/59 |
| 2,272,614 | 2/1942 | Reinken et al. | 62/114 |
| 2,457,247 | 12/1948 | Lawshe | 73/59 |
| 2,522,648 | 9/1950 | Tacchella | 62/2 |
| 2,541,814 | 2/1951 | Gaddini | 62/114 |
| 2,793,505 | 5/1957 | Finch | 62/114 |
| 3,046,755 | 7/1962 | Sale | 62/136 |
| 3,087,708 | 4/1963 | Sims | 366/230 |
| 3,108,449 | 10/1963 | Lents | 62/70 |
| 3,407,618 | 10/1968 | Mullins, Jr. | 62/136 |
| 3,695,051 | 10/1972 | Hunt | 62/136 |
| 3,926,414 | 12/1975 | Tanguy | 62/136 X |
| 4,009,588 | 3/1977 | Tanguy et al. | 62/126 |

OTHER PUBLICATIONS

Flyer (ICF-71/1), printed on one side, entitled, "Udico Electric Ice Cream Freezers."
Flyer, printed on both sides, entitled, "Waring Ice Cream Parlor."
Flyer, printed on both sides, entitled, "Cornwall Ice Cream Freezers."

Primary Examiner—Philip R. Coe
Attorney, Agent, or Firm—George R. Clark; Neil M. Rose; Allen J. Hoover

[57] ABSTRACT

In a portable freezer for preparation of sherbet, ice cream, and other frozen confections, of a type comprising a stationary bucket, which has an open top and is adapted to hold ice, salt, and brine, a removable can, which is adapted to hold confections being frozen, and which is seated within the bucket so as to be rotatable about a vertical axis, a removable head, which comprises horizontal arms bridging the open top of the bucket and a cover covering the can and its contents, a motor, which is arranged to rotate the can within the bucket about said vertical axis in one rotational sense, and a dasher, which is mounted within the can and beneath the cover so as to remain relatively stationary as the can is rotated, an improvement is disclosed wherein the dasher is journalled so as to be rotatable about said vertical axis, wherein the dasher is restrained by resilient means permitting a range of limited rotation of the dasher about said vertical axis and biasing the dasher so as to oppose such rotation of the dasher in said rotational sense, and wherein a horizontal arm is coupled mechanically to the dasher so as to rotate with the dasher and is extended outside an external surface of the head so as to provide progressive visual indication of such rotation of the dasher, whereby progressive visual indication of firmness of the contents of the can is provided.

5 Claims, 8 Drawing Figures

PORTABLE FREEZER HAVING MECHANICAL MEANS PROVIDING VISUAL INDICATION OF FIRMNESS OF CONTENTS

This application is a continuation, of application Ser. No. 069,016, filed Aug. 22, 1979, and now abandoned.

BACKGROUND OF THE INVENTION

1. Field of the Invention

This invention pertains to a portable freezer for preparation of sherbet, ice cream, and other frozen confections, of a type comprising a stationary bucket having an open top and holding ice, salt, and brine, a removable can holding confections being frozen, a removable head comprising horizontal arms bridging the open top of the bucket and a cover covering the can and its contents, a motor arranged to rotate the can within the bucket, and a dasher mounted within the can and beneath the cover so as to remain relatively stationary as the can is rotated. Such portable freezers are commonplace in households.

2. Brief Description of the Prior Art

It is conventional for a user to operate a portable freezer of the type noted above until the contents of the can have been frozen to such firmness that relative rotation of the can and the dasher is impeded, whereupon the motor begins to stall and the user must take positive steps to disable the motor. Such a freezer is exemplified in U.S. Pat. No. 3,087,708 to W. M. Sims.

As exemplified in U.S. Pat. No. 1,449,458 to L. A. Sutermeister, it is known for electrical loads on the motor of a power driven ice cream freezer to be monitored, by means of an ammeter. However, such a scheme is not suitable for a portable freezer to be used in households, because the ammeter must be calibrated for each mixture, composition, or recipe.

As exemplified in U.S. Pat. No. 3,926,414 to P. Tanguy and U.S. Pat. No. 4,009,588 to P. Tanguy et al., it is known to sense emanated heat from the motor of a portable freezer of similar utility, to open a circuit so as to disable the motor when high temperatures reflecting heavy loads on the motor are sensed, and to actuate an alarm when the motor is disabled. Cf. U.S. Pat. No. 1,880,021 to G. C. McCauley et al.

As exemplified in U.S. Pat. No. 2,541,814 to N. F. Gaddini, it is known to provide a portable freezer, of a type comprising a similar can but having no stationary bucket for ice, salt, and brine, and needing to be placed in a freezing locker or other such enclosure at low temperature, with a dasher, which is permitted limited rotation but restrained by a spring, and with a switch, which is linked to the dasher and arranged to disable the motor upon sufficient rotation of the dasher. Cf. U.S. Pat. No. 3,407,618 to J. N. Mullins, Sr., and U.S. Pat. No. Re 27,019 to C. B. Harber.

Various other mechanisms, which respond to the firmness of confections being frozen in various types of freezers employing various types of dashers, blades, or paddles, are exemplified in U.S. Pat. No. 1,763,567 to A. T. Simmons et al., U.S. Pat. No. 2,272,614 to L. W. Reinken et al., U.S. Pat. No. 2,552,648 to A. J. Tacchella, U.S. Pat. No. 2,793,505 to D. M. Finch, U.S. Pat. No. 3,046,755 to R. Y. Sale, U.S. Pat. No. 3,108,449, and U.S. Pat. No. 3,695,051 to W. B. Hunt. Some of these freezers are not suitable for use in households.

It would be desirable if the user of a portable freezer, of the type to which this invention pertains, could have some way simply, progressively, and visually to monitor the firmness of the contents being frozen, so as to be able to prepare soft confections, as well as firm confections, of a variety of different recipes yielding optimum results at different firmnesses. There should be no need for the user to calibrate any components for different recipes.

SUMMARY OF THE INVENTION

This invention addresses the need noted above and provides an improvement in a portable freezer for preparation of sherbet, ice cream, and other frozen confections, of a type comprising a stationary bucket, which has an open top and is adapted to hold ice, salt, and brine, a removable can, which is adapted to hold confections being frozen, and which is seated within the bucket so as to be rotatable about a vertical axis, a removable head, which comprises horizontal arms bridging the open top of the bucket and a cover covering the can and its contents, a motor, which is arranged to rotate the can within the bucket about said vertical axis in one rotational sense, and a dasher, which is mounted within the can and beneath the cover so as to remain relatively stationary at the can is rotated.

Pursuant to this invention, the dasher is journalled so as to be rotatable about said vertical axis, the dasher is restrained by resilient means permitting a range of limited rotation of the dasher about said vertical axis and biasing the dasher so as to oppose such rotation of the dasher in said rotational sense, and a horizontal arm is coupled mechanically to the dasher so as to rotate with the dasher and is extended outside an external surface of the head so as to provide progressive visual indication of such rotation of the dasher, whereby progressive visual indication of the firmness of the contents of the can if provided. Preferably, the horizontal arm is rotated so as to pass along an adjacent scale, which is indicated on the external surface of the head, and which indicates the range of limited rotation of the dasher.

In a preferred embodiment of this invention, the resilient means comprises a coiled spring connected in tension between a midpart of the arm and a stationary part of the head. Also, the external surface on which the scale is indicated is cylindrical about said vertical axis, and a vertical finger is carried by one end of the arm so as to pass along the scale as the arm is rotated with the dasher. The improvement may be embodied either in such a freezer having the motor above the can, whereupon the motor may be carried by the head, or in such a freezer having the motor below the can, whereupon the motor may be carried in a base supporting but being separable from the bucket. The user of such a freezer is provided progressive visual indication of the firmness of the contents being frozen. When desired firmness is indicated, the user may disable the motor, so as to be able to prepare soft confections, as well as firm confections, of a variety of different recipes yielding optimum results at different firmnesses. There is no need for the user to calibrate any components for different recipes.

DETAILED DESCRIPTION OF PREFERRED EMBODIMENTS

Figure 1:
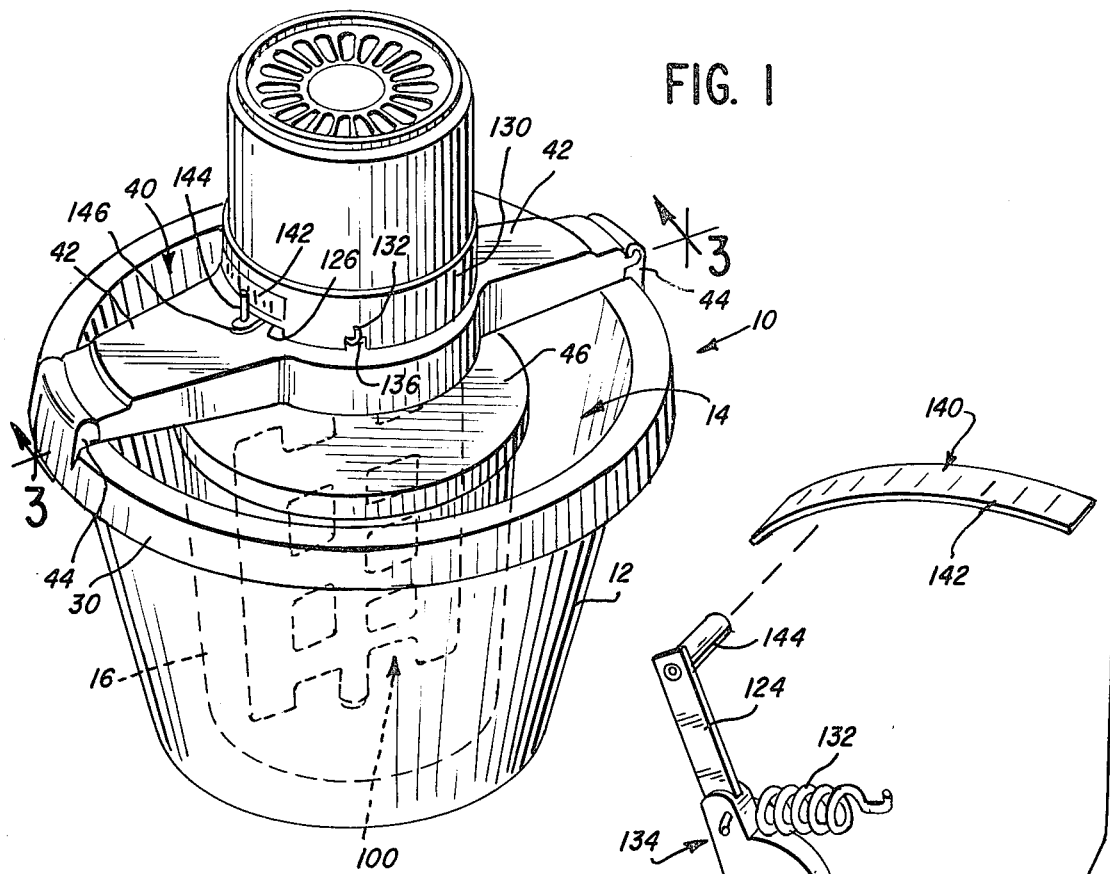
FIG. 1 is a perspective view of a portable freezer constituting a preferred embodiment of this invention.
Figure 2:
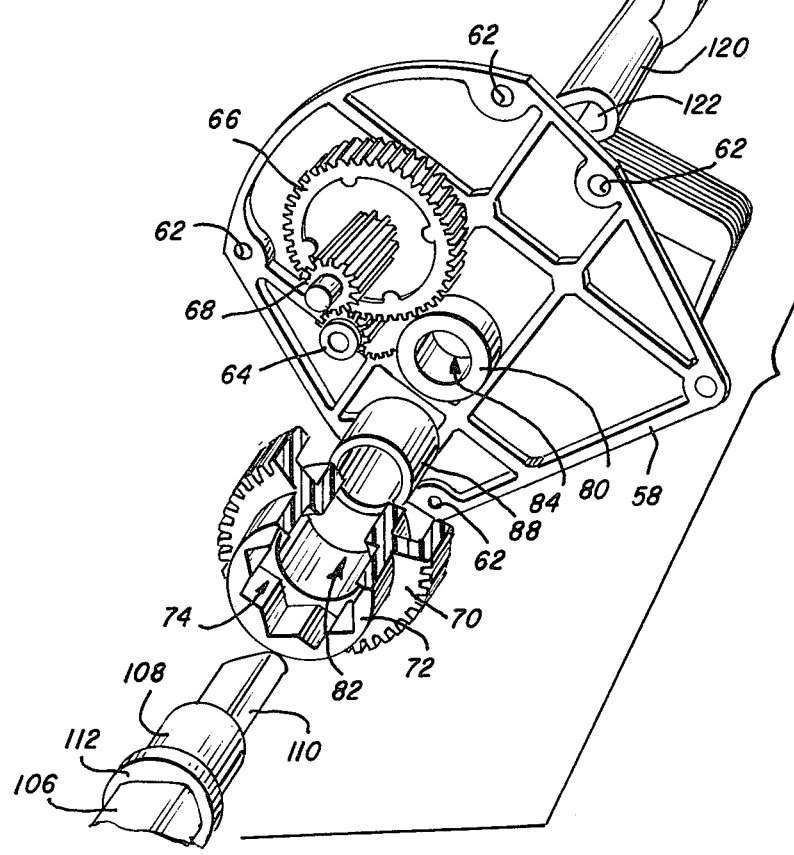
FIG. 2 is an exploded view, from a different perspective and on an enlarged scale of certain interrelated components of the portable freezer of FIG. 1, a cover shown in FIG. 1 being omitted for clarity of illustration.
Figure 3:
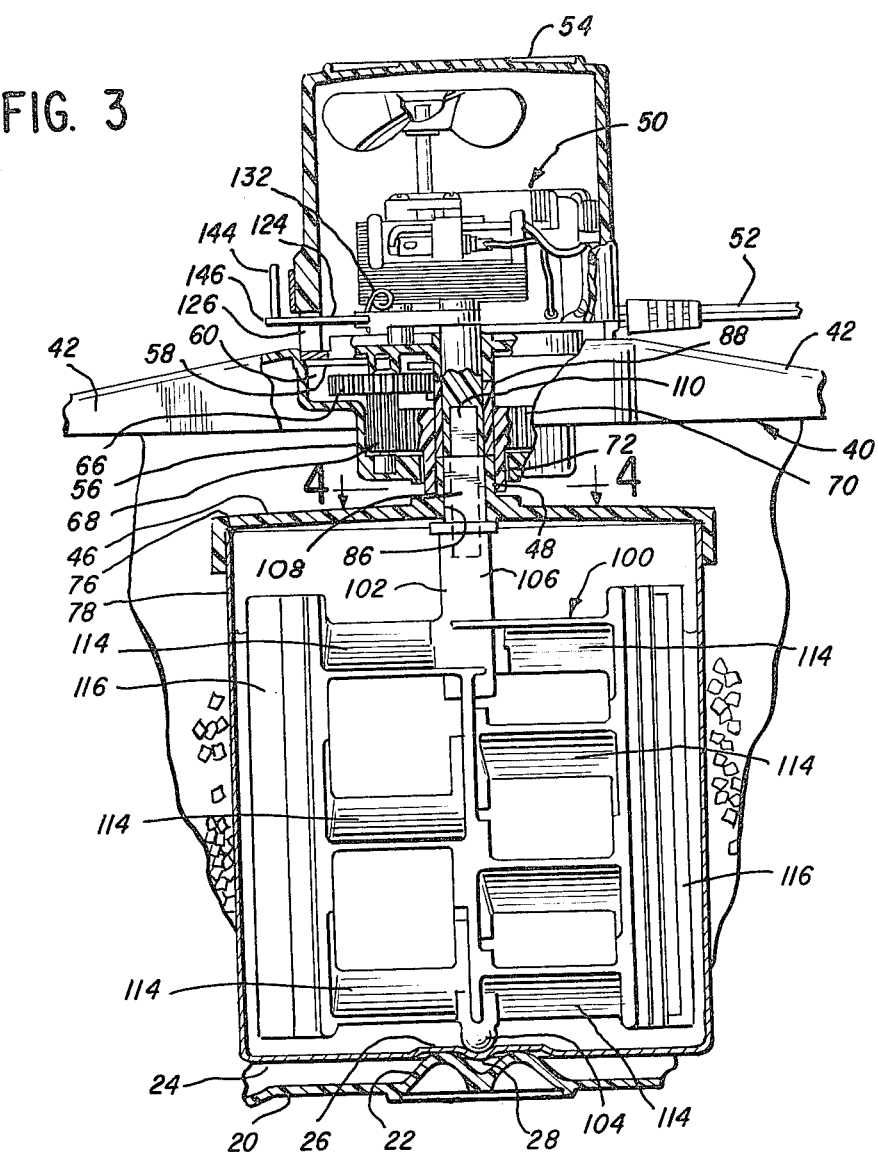
FIG. 3 is a fragmentary sectional view along the line 3—3 of FIG. 1 in the direction of the arrows.
Figure 4:
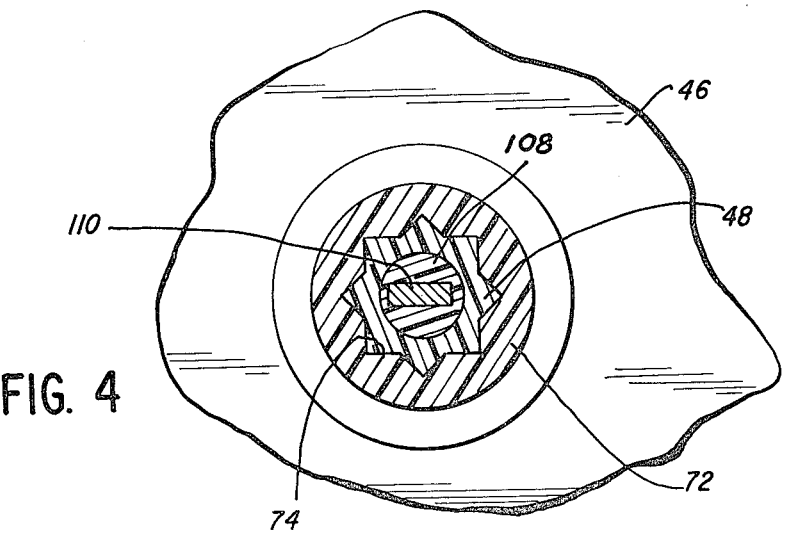
FIG. 4 is a fragmentary sectional view along line 4—4 of FIG. 3 in the direction of the arrows.

As shown in FIGS. 1 through 4, this invention may be embodied in a portable freezer 10 comprising a stationary bucket 12, which has an open top 14 and is adapted to hold ice, salt, and brine, and a removable can 16, which is adapted to hold confections being frozen, and which is seated within the bucket 12 so as to be rotatable about a vertical axis. When seated within the bucket 12, the can 16 is to be surrounded by ice, salt, and brine as suggested in FIG. 3. The bucket 12, which may be seated in an outer container (not shown) of wood, decorative plastic, or other suitable material, may be made of suitable brineproof material, polyethylene as an example. The bottom wall 20 of the bucket 12 is fabricated, as shown in FIG. 3, so as to have an annular formation 22 providing a bearing surface beneath the can 14. The bottom wall 24 of the can 14 is fabricated, as shown in FIG. 3, so as to have an annular formation 26, which cooperates with the annular formation 22 so as to locate the bottom wall 24 of the can 16 on the bottom wall 20 of the liner 18 for proper rotation of the can 16 within the bucket 12, and which provides a central depression 28 in the bottom wall 24 of the can 16 for a purpose to be described below. The can 14 may be made of light metal for minimal friction between the annular formation 26 on the bottom wall 24 of the can 16 and the annular formation 22 on the bottom wall 20 of the bucket 12 of polypropylene. An upper margin 30 of the bucket 12 is flared for a purpose to be described below.

A removable head 40 comprises horizontal arms 42, which bridge the open top 14 of the bucket 12, and which lock removably in opposite brackets 44 mounted on the flared margin 30 for the proper alignment of the head 40 on the bucket 12. The head 40 also comprises a cover 46, which covers the can 16 and its contents when the head 40 is aligned on the bucket 12. The cover 46, which may be made of molded plastic material, has an upper hub 48 of noncircular cross-section externally for a purpose to be described below. An electric motor 50 of a conventional type is carried by the head 40 and arranged to rotate the can 16 within the bucket 12 in one rotational sense, a clockwise sense, as shown, if the freezer 10 is viewed from above. The motor 50 may be energized through a conventional cord 52, which may be connected to a conventional source of electrical power (preferably 110 VAC, 60 Hz) so as to energize the motor 50, and which may be disconnected so as to deenergize the motor 50. A manual switch (not shown) of a conventional type may be provided so as to enable the motor 50 to be deenergized without disconnection of the cord 52. The head 40 also comprises a shroud 54, which covers the motor 50, a gear box 56, which is mounted beneath the motor 50, and a horizontal plate 58, on which the motor 50 is supported, and which is fastened between the shroud 54 and the gear box 56 by conventional screws 60 at respective apertures 62 in the plate 58.

The motor 50 is arranged to rotate the can 14 via a train of spur gears reducing its rotational speed, being enclosed substantially by the gear box 56, and comprising a small pinion 64, which is driven by the motor 50, a large idler 66, which is driven by the pinion 64, a small idler 68, which is arranged so as to rotate with the large idler 66, and a large gear 70, which is driven by the small idler 68, and which has a lower hub 72 wherein a lower axial socket 74 of noncircular cross section receives the hub 48 of the cover 46 for conjoint rotation of the cover 46 with the gear 70. The cover 46 engages the upper edge 76 of the lateral wall 78 of the can 16 so as to provide sufficient friction for the can 16 to be rotated within the bucket 12 when the cover 46 thus is rotated by the motor 50. As described so far, the portable freezer 10 is similar to prior portable freezers in which stationary dashers have been employed, as sold by Northern Electric Company, a division of Sunbeam Corporation, 5224 North Kedzie Avenue, Chicago, Ill. 60625, and its predecessors, under its trademark DOLLY MADISON.

The plate 58 is formed with a tubular hub 80 extending downwardly and mounting the gear 70, which has an upper axial socket 84 of circular cross section communicating with the lower axial socket 74, as shown in FIG. 3. The hub 48 of the cover 46 has an axial socket 86 of similar cross section. A tubular sleeve 88, which is similar in outer cross section to the hub 80, has an axial socket 90, which is similar in its cross section to the socket 84 and the socket 86. The sleeve 88 fits coaxially between the hub 80 of the plate 58 and the hub 48 of the cover 46 and permits relative rotation therebetween.

A dasher 100 is mounted within the can 16 and beneath the cover 46 so as to remain relatively stationary as the can 16 thus is rotated. The dasher 100 includes a central arbor 102 having a lower end 104, which is rounded so as to be seated in the central depression 28 in the bottom wall 24 of the can 16, and an upper end 106, which has a cylindrical portion 108 fitting rotatably in the socket 86 of the hub 48 of the cover 46, and which has a stub 110 of noncircular cross section extending axially from its cylindrical portion 108. The stub 110, which is a separate piece molded in the upper end 106 of the arbor 102, extends upwardly through the socket 82 of the gear 70. An annular shoulder 112 beneath the cylindrical portion 108 abuts the hub 48 of the cover 46. The dasher 100 has radial arms 114 carrying a pair of vertical blades 116, which are arranged to traverse the lateral wall 78 of the can 16 as the can 16 is rotated with respect to the dasher 100, so as to work the contents of the can 16 in a conventional manner. If the dasher 100 were to be held against rotation with respect to the bucket 12, the dasher 100 would be similar to conventional dashers. However, the dasher 100 is permitted a range of limited rotation about the vertical axis of rotation of the can 16.

An arbor 120, which is cylindrical in outer cross section, fits rotatably through the socket 84 of the hub 80 of the plate 58 and through the socket 90 of the sleeve, so as to abut the cylindrical portion 108 of the upper end 106 of the arbor 102 of the dasher 100. The arbor 120 has an axial slot 122, which receives the stub 110, for conjoint rotation of the arbor 120 and the arbor 102. A horizontal arm 124 is fixed to the arbor 102, above the plate 58, and extends through an arcuate slot 126, in a cylindrical wall 130 of the shroud 54, above one of the arms 42.

The slot 126 delimits a range of limited rotation of the arm 124, a range of limited rotation of the arbor 120 with respect to the lead 40, and a range of limited rotation of the dasher 100 with respect to the bucket 12, about the vertical axis of rotation of the can 16. As shown, a coiled spring 132 is connected in tension between a midpoint 134 of the arm 124 and a cutout 136 in the same wall 130 of the shroud 54. Alternatively, the coiled spring 132 may be connected in tension between the midpoint 134 of the arm 124 and an integral boss (not shown) on the plate 58. The coiled spring 132 restrains the dasher 100 so as to oppose such rotation of the dasher 100 in the rotational sense wherein the can 16 is rotated, in a clockwise sense, as shown, if the freezer 10 is viewed from above.

A scale 140 is indicated on a label 142, which is affixed to the same wall 130 of the shroud 54, above the slot 126. The scale 140 indicates the range of limited rotation of the dasher 100. A vertical finger 144 is carried by the distal end 146 of the arm 124 so as to pass along the scale 140 as the arm 124 is rotated with the dasher 100. Passage of the finger 144 along the scale 140, as the arm 124 is rotated with the dasher 100, provides progressive visual indication of the firmness of the contents of the can 16. As the firmness of the contents of the can 16 increases, relative rotation between the can 16 and the dasher 100 becomes impeded progressively, and the arm 124 rotates so as to move the finger 144 further across the scale 140, in a clockwise sense, as shown, if the freezer 10 is viewed from above.

Figure 5:
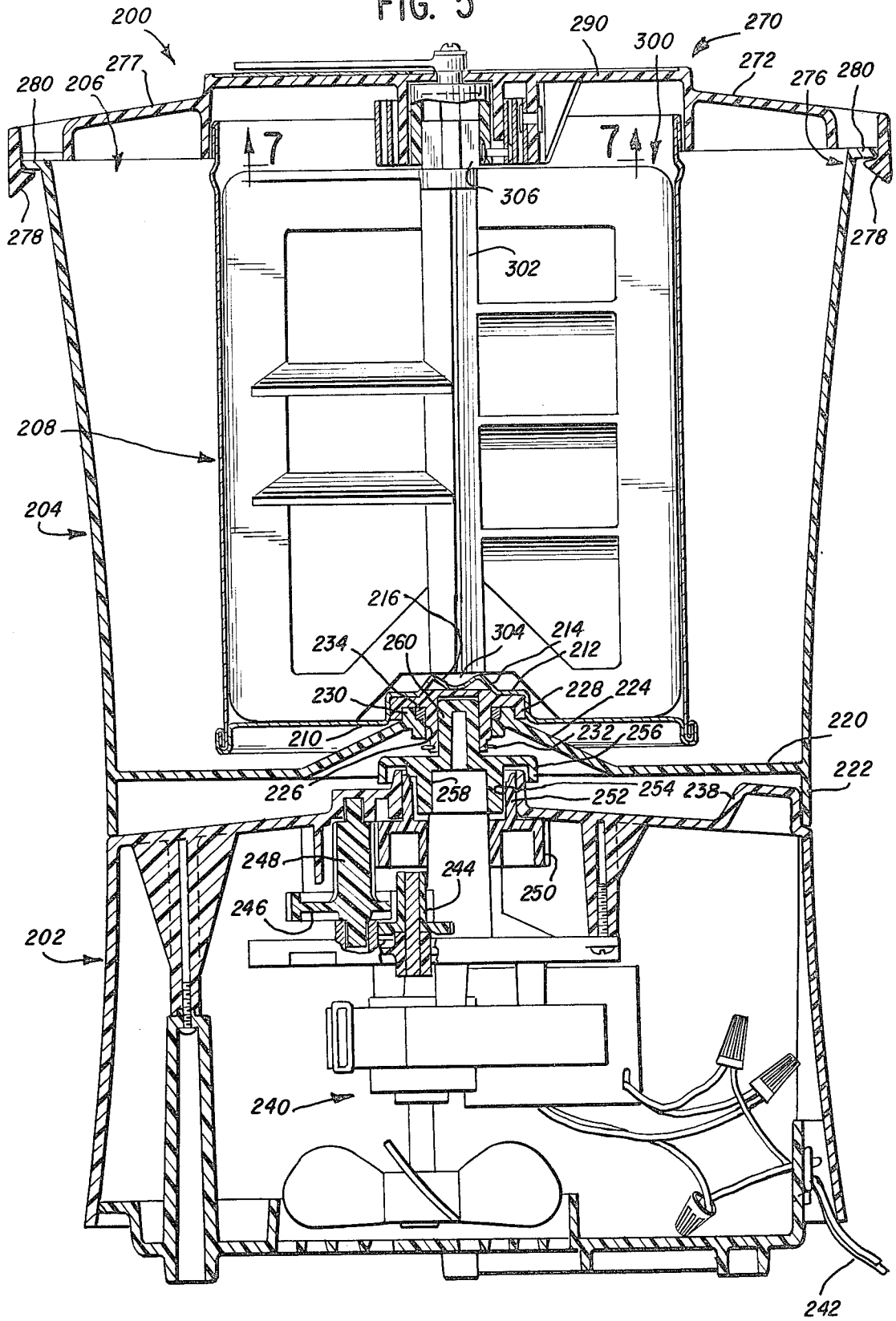
FIG. 5 is a sectional view along a vertical axis of a portable freezer constituting an alternative embodiment of this invention.
Figure 6:
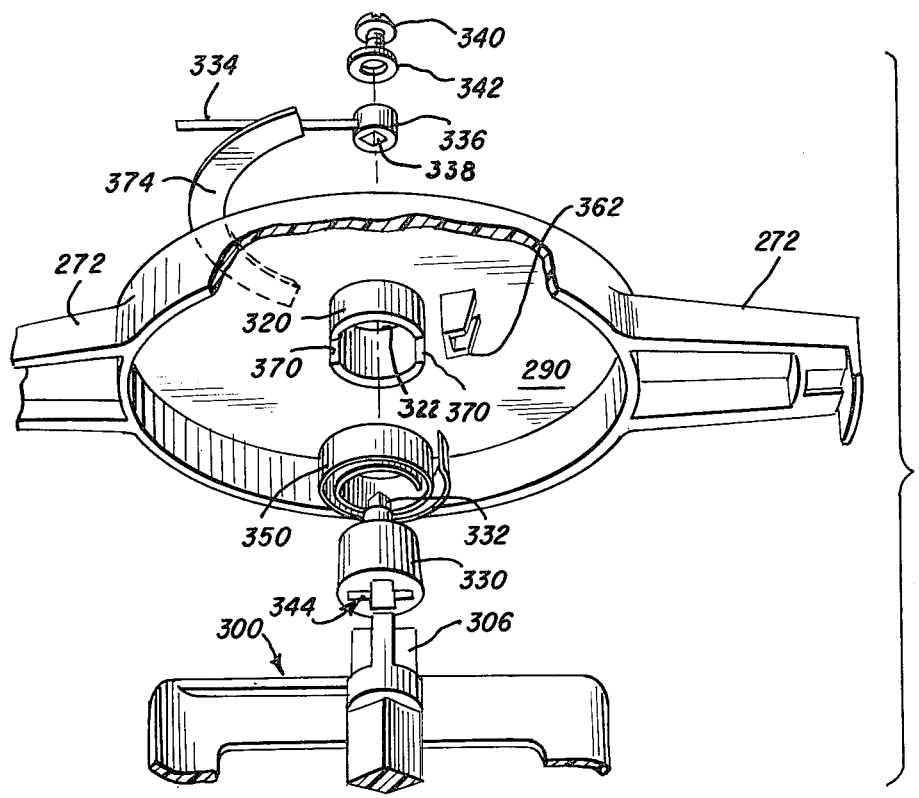
FIG. 6 is an exploded, fragmentary, perspective view of certain interrelated components of the portable freezer of FIG. 5.
Figure 8:
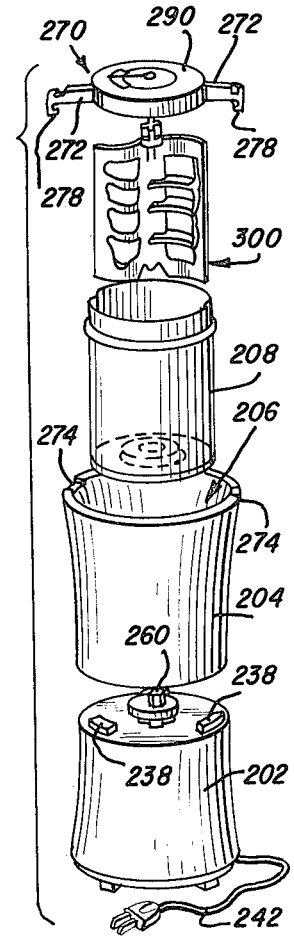
FIG. 8 is an exploded, perspective view of the portable freezer of FIG. 5.
Figure 7:
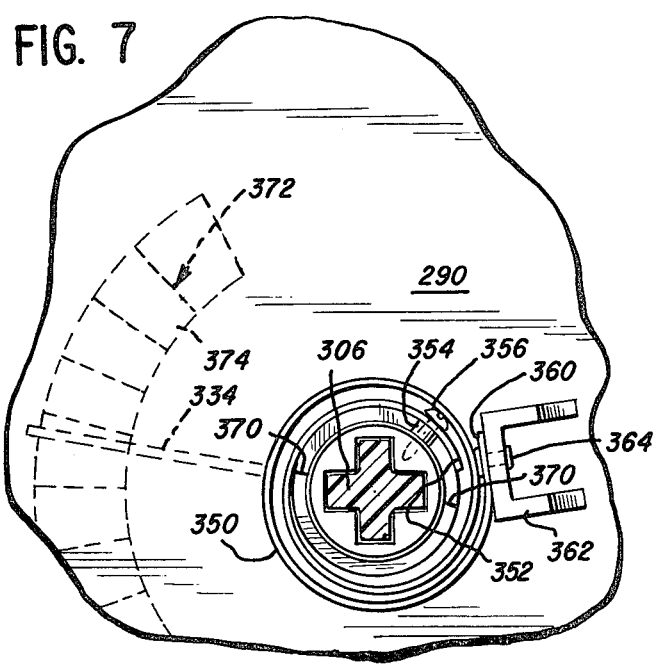
FIG. 7 is a fragmentary, sectional view taken along line 7—7 of FIG. 5 in the direction of the arrows.

As disclosed in FIGS. 5 through 8, this invention may be embodied in a portable freezer 200 comprising a stationary base 202, a stationary bucket 204, which is seated on the base 202 but separable therefrom, and which has an open top 206 and is adapted to hold ice, salt, and brine, and a removable can 208, which is adapted to hold confections being frozen, and which is seated within the bucket 202 so as to be rotatable about a vertical axis. When seated within the bucket 204, the can 208 is to be surrounded by ice, salt, and brine. The bottom wall 210 of the can 208 is fabricated, as shown in FIG. 5, so as to have a central recess 212 of non-circular cross section for a purpose to be described below, and so as to have an annular formation 214 providing a central depression 216 for a purpose to be described below.

The bottom wall 220 of the bucket 204 is elevated, so as to leave a cylindrical skirt 222 on the bucket 204, and formed with conical midportion 224, having a cylindrical aperture 226. A separate hub 228, which has an upper head of noncircular cross section extending over an annular boss 230 around the aperture 226 and fitting the recess 212 in the bottom wall 210 of the can 208, is journalled in the cylindrical aperture 226 and secured to the conical midportion 224 of the bottom wall 220 of the bucket 204 by a retaining ring 232 of a conventional type. An O-ring 234 of a conventional type is disposed in an annular groove 236 in the annular boss 230 so as to seal the aperture 226. Thus, the can 208 is removable from the hub 228, which is journalled but secured by the ring 232. Upright bosses 238 on the base 202 cooperate with the skirt 222 so as to locate the bucket 204 on the base 202.

An electric motor 240 of a conventional type is carried in the base 202 and arranged to rotate the can 208 on the hub 228 in a counterclockwise sense, as shown, if the freezer 200 is viewed from above. The motor 240 may be energized through a conventional cord 242, which may be connected to a conventional source of electrical power (preferably 110 VAC, 60 Hz) so as to energize the motor 240, and which may be disconnected so as to deenergize the motor 240. A manual switch (not shown) of a conventional type may be provided so as to enable the motor 240 to be deenergized without disconnection at the cord 242.

The motor 240 is arranged to rotate the can 206 via a train of spur gears reducing its rotational speed and comprising a small pinion 244, which is driven by the motor 240, a large idler 246, which is driven by the pinion 244, a small idler 248, which is arranged so as to rotate with the large idler 246, and a large gear 250, which is driven by the small idler 248, and which has an upper hub 252 having an axial socket 254 of noncircular cross-section. An intermediate coupler 256 has a lower hub 258 of noncircular cross section fitting the axial socket 254 and an upper driver 260 of noncircular cross section fitting an axial socket 262 of noncircular cross section in the hub 228. The coupler 256 couples the hub 228 to the gear 250, so as to enable the motor 240 to rotate the can 206 via the hub 228.

A removable head 270 comprises horizontal arms 272, which bridge the open top 206 of the bucket 204, and which fit into complementary recesses 274 in the upper margin 276 of the bucket 204, which end portions 278 of the arms 272 are shaped so as to lock over a marginal lip 280 of the bucket 204. The head 270 also comprises a cover 290, which fits loosely over the can 208 and its contents, so as to remain stationary as the can 208 is rotated. An described so far, the portable freezer 200 is similar to prior portable freezers, in which stationary dashers were used, as sold by Northern Electric Company, supra, under its trademark MASTER CHEF.

A dasher 300 is mounted within the can 208 and beneath the cover 290 so as to remain relatively stationary as the can 208 thus is rotated. The dasher 300 includes a central arbor 302 having a lower end 304, which is conical so as to be seated in the central depression 216 in the bottom wall 210 of the can 208, and an upper end 306 of noncircular cross section for a purpose to be described below. The dasher 300 has horizontal arms 310 carrying a pair of vertical blades 312, which are arranged in traverse the lateral wall 314 of the can 208 as the can 208 is rotated with respect to the dasher 300, so as to work the contents of the can 208 in a conventional manner. If the dasher 300 were to be held against rotation with respect to the bucket 204, the dasher 300 would be similar to conventional dashers. However, the dasher 300 is permitted a range of limited rotation about the vertical axis of rotation of the can 204.

A tubular sleeve 320 extends downwardly from a central aperture 322 of circular cross section in the cover 290 and is cut away so as to leave a dependent half-section 324 over about one-half of its circumference. A rotary coupler 330 is journalled in the sleeve 320. A vertical stub 332 of non-circular cross-section extends upwardly through the aperture 322 and mounts a horizontal arm 334, which is affixed to and extends from a small sleeve 336 having an axial aperture 338 of complementary cross-section, and which is secured by a screw 340 passing through a washer 342 into a socket (not shown) in the stub 332. The upper end 306 of non-circular cross section of the arbor 302 is received in an axial socket 344 of complementary cross section in the coupler 330.

A flat spring 350 is coiled around the sleeve 320 in a counterclockwise sense, as shown, if the freezer 200 is viewed from below. Its inner end 352 is spaced from the coupler 330 by a tubular spacer 354 and fastened to the coupler 330 by a screw 356 passing through the inner end 352 and the spacer 354 into a socket (not shown) in the coupler 330. The length of the spacer 354 is about equal to the axial thickness of a wall portion of the sleeve 320. The outer end 360 of the spring 350 is fastened to an abutment 362 by a screw 364. The abutment 362 is integral with the cover 290 so as to depend therefrom.

The end surfaces 370 of the dependent half-section 324 of the sleeve 320 delimit a range of limited movement of the inner end 352 of the spring 350, because of possible physical interference between the spacer 354 and the extended section 324. The dasher 300 thus is permitted a range of limited rotation with respect to the bucket 206 about the vertical axis of rotation of the can 208. The spring 350 is coiled so as to oppose such rotation of the dasher 300 in the rotational sense wherein the can 208 is rotated, in a counterclockwise sense, as shown, if the freezer 200 is viewed from above.

A scale 372 is indicated on a label 374, which is affixed to the cover 290, beneath the arm 334. Passage of the arm along the scale 372, as the arm 334 is rotated with the dasher 300, provides progressive visual indication of the firmness of the contents of the can 208. As the firmness of the contents of the can 208 increases, relative rotation between the can 208 and the dasher 300 becomes impeded progressively, and the arm 334 rotates farther across the scale 372, in a counterclockwise sense, if the freezer 200 is viewed from above.

A user of either portable freezer embodying this invention can ascertain visually when to deenergize the motor, if it is desired to do so before the motor begins to stall, so as to produce a frozen confection of a desired firmness. The scale may prove to be useful for reference in recipes written for uses of the portable freezer.

I claim:

1. In a portable freezer for preparation of sherbet, ice cream, and other frozen confections, of a type comprising a stationary bucket, which has an open top and is adapted to hold ice, salt, and brine, a removable can, which is adapted to hold confections being frozen, and which is seated within the bucket so as to be rotatable about a vertical axis, a removable head, which comprises horizontal arms bridging the open top of the bucket and a cover covering the can and its contents, a motor, which is arranged to rotate the can within the bucket about said vertical axis in one rotational sense, and which may be deenergized manually if it is desired to do so before the motor begins to stall, and a dasher, which is mounted within the can and beneath the cover so as to remain relatively stationary as the can is rotated, an improvement wherein the dasher is journalled so as to be rotatable about said vertical axis, wherein the dasher is restrained by resilient means permitting a range of limited rotation of the dasher about said vertical axis and biasing the dasher so as to oppose such rotation of the dasher in said rotational sense, and wherein a horizontal arm is coupled mechanically to the dasher so as to rotate with the dasher and is extended outside an external surface of the head so as to provide progressive visual indication of such rotation of the dasher, and wherein there is no need for a user to calibrate any components for different recipes, whereby progressive visual indication of the firmness of the contents of the can is provided so that when desired firmness is indicated, the user may disable the motor before the motor begins to stall, so as to be able to prepare soft confections, as well as firm confections, of a variety of different recipes yielding optimum results at different firmnesses.

2. The improvement of claim 1 wherein the arm is rotated with the dasher so as to pass along an adjacent scale, which is indicated on the external surface of the head, and which indicates the range of limited rotation of the dasher.

3. The improvement of claim 2 wherein the external surface on which the scale is indicated is cylindrical about said vertical axis and wherein a vertical finger is carried by one end of the arm so as to pass along the scale as the arm is rotated with the dasher.

4. The improvement of claim 1, 2, or 3 wherein the resilient means comprises a coiled spring connected in tension between a midpart of the arm and a stationary part of the head.

5. The improvement of claim 1, 2, or 3 wherein there is no provision for the horizontal arm to deenergize the motor at any point in the rotation of the horizontal arm.

* * * * *